3,182,091
NITROBENZOTRICHLORIDES AND PROCESS FOR THEIR MANUFACTURE

Otto Scherer, Bad Soden, Taunus, Helmut Hahn, Frankfurt am Main, and Norbert Münch, Kelkheim, Taunus, Germany, assignors to Farbwerke Hoechst Aktiengesellschaft vormals Meister Lucius & Brüning, Frankfurt am Main, Germany, a corporation of Germany
No Drawing. Filed Feb. 18, 1963, Ser. No. 259,405
Claims priority, application Germany, Feb. 24, 1962, F 36,119
9 Claims. (Cl. 260—646)

The present invention relates to nitrobenzotrichlorides which may be substituted on the benzene nucleus by at most four fluorine and/or chlorine atoms and to a process for their manufacture.

It has been found that nitrobenzotrichlorides which may be substituted on the benzene nucleus by at most four fluorine and/or chlorine atoms can be prepared in simple manner by treating at a temperature of between about −20° and about +40° C., preferably about −10° and about +30° C. benzotrichloride which may be substituted on the benzene nucleus by at most four fluorine and/or chlorine atoms with nitric acid of about 95 to 98% strength by weight or with a nitrating acid which is a mixture of nitric and sulfuric acid containing from about 5% to about 85% nitric acid. In addition, if desired, up to 30% by weight of sulfur trioxdie, calculated on the amount of sulfuric acid present in the acid mixture, and at most 30% by weight of water calculated on the amount of sulfuric acid present in the acid mixture during the nitration process may be included with the nitrating acid.

Although the mixture of nitric and sulfuric acid used may contain up to 30% by weight of water calculated on the amount of sulfuric acid being present in said acid mixture, it is advantageous to provide that it contains not more than 20% by weight of water, since when operating with a higher water content, there takes place an increasing saponification of the trichloromethyl group with simultaneous reduction of the speed of nitration. It is particularly advantageous to work with a mixture of nitric and sulfuric acid, the water content of which amounts to about 5 to 15% by weight, calculated on the amount of sulfuric acid present, when the reaction is complete. The use of a mixture of nitric and sulfuric acid containing up to 30% by weight, preferably up to 20% by weight, of sulfur trioxide, permits working largely without water during the nitration. When using an acid mixture containing more than 30% by weight of sulfur trioxide, the reaction takes place unsatisfactorily in many respects.

The nitric acid content of the nitrating acid mixture of nitric and sulfuric acids used may vary within wide limits; the nitration can be carried out, for example, with an acid mixture containing about 5% by weight of nitric acid. It is of advantage to select a mixture containing at least 15% of sulfuric acid. Thus, a mixture having from about 5% to 85% of nitric acid and from about 95% to 15% of sulfuric acid is a suitable nitrating acid.

The amount of nitric acid present in the acid mixture mentioned should range advantageously from 100 to about 120 mols percent, calculated on the benzotrichloride compound to be nitrated. There can, however, also be used a higher excess of nitric acid, for example up to about 200 mols percent or more, calculated on the compound to be nitrated, since even when using so high an excess, no dinitration of the benzene nucleus occurs under the above-mentioned reaction conditions.

When using nitric acid of about 95 to 98% strength by weight instead of the mixture of nitric and sulfuric acid mentioned, it is necessary to operate with an adequately high excess of nitric acid, calculated on the compound to be nitrated. The excess of nitric acid of about 98% strength by weight advantageously amounts to about 600 to 2000 mols percent. It is, however, possible to work with an even higher excess.

The nitration may be carried out in the presence of an inert solvent such as carbon tetrachloride. The nitrating temperature ranges from about −20° to +40° C., preferably from about −10° to +30° C. The optimum temperature to be applied in each individual case has to be adjusted to the compound within the temperature range indicated.

The temperature can be kept at the desired height by adjusting the speed with which one component is added to the other component first introduced into the reaction vessel and/or by suitably cooling the reaction mixture.

The nitration of the benzotrichloride which may be substituted on the benzene nucleus by fluorine and/or chlorine atoms can be carried out by adding the nitrating acid slowly to the benzotrichloride compound first introduced into the reaction vessel at a temperature within the indicated range, while stirring. In many cases it is recommendable to operate conversely—depending on the compound to be nitrated—i.e. to add the benzotrichloride compound to be nitrated slowly to the nitrating acid first introduced into the reaction vessel at a tempearture within the indicated range, while stirring.

According to the process of the present invention it is possible to convert various benzotrichlorides as, for example, the benzotrichloride itself, o-, m- and p-fluorobenzotrichlorides, o-, m- and p-chlorobenzotrichlorides, 2,4-dichlorobenzotrichlorides or the 3-chloro-4-fluorobenzotrichloride into the corresponding mononitro compounds. Nitrobenzotrichlorides substituted on the benzene nucleus by halogen atoms have hitherto not been described in literature.

It must be considered surprising that benzotrichlorides which may be substituted on the benzene nucleus by fluorine and/or chlorine atoms can be transformed successfully into the corresponding nitro compounds in simple manner according to the process of the present invention, since—as is known—only chlorine-containing nitrobenzoic acids resulted when treating benzotrichloride at room temperature [Liebig's Annalen der Chemie 146, 333] or at temperatures of between −10° and 15° C. [Berichte der Deutschen Chemischen Gesellschaft 52, 315] with concentrated nitric acid; furthermore, it is known that nitrobenzoic acids only [Berichte der Deutschen Chemischen Gesellschaft 52, 315] were obtained when nitrating benzotrichloride at −12° C. with concentrated nitric acid in carbon tetrachloride in the presence of phosphor pentoxide acting as dehydrating agent.

The preparation of a nitrated benzotrichloride described in relevant literature by treating benzotrichloride with dinitropentoxide in carbon tetrachloride solution [Berichte der Deutschen Chemischen Gesellschaft 52, 315] or with nitric acid in the presence of acetic anhydride is a cumbersome and technically impracticable process.

The nitrobenzotrichlorides prepared in the process of the present invention are obtained in good to very good yields and are valuable intermediate products used for preparing dyestuffs. After having been converted into the corresponding carboxylic acid chlorides by saponification with water in the presence of a catalyst, such as iron (III) chloride, they can be reacted with dyestuffs containing amino groups to yield valuable reactive dyestuffs which are suitable for the dyeing of native or regenerated cellulose materials. The following formula schemes represent two of the conversion processes mentioned above:

(a) 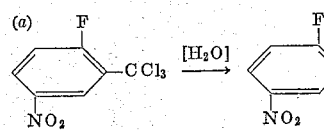

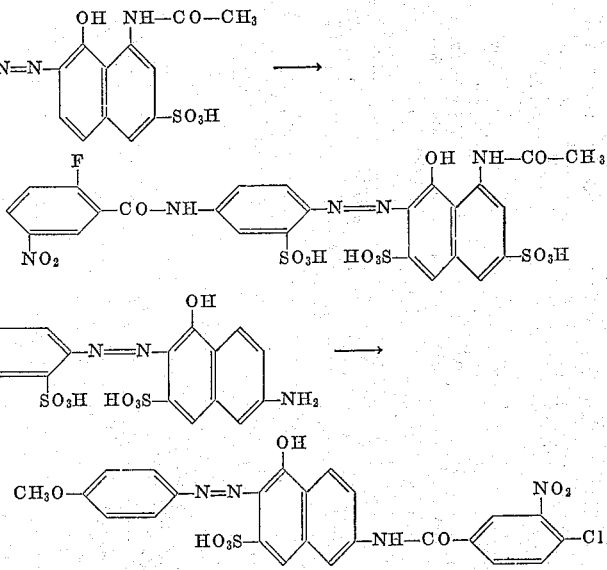

(b) 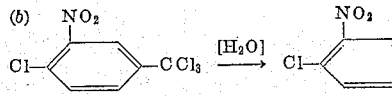

The following examples illustrate the invention, but they are not intended to limit it thereto, the parts and percentages being by weight unless otherwise stated and the relationship of parts by weight to parts by volume being the same as that of the kilogram to the liter.

Example 1

230 parts of o-chlorobenzotrichloride are added dropwise within 1 hour at 5° to 10° C. to 220 parts of anhydrous nitrating acid containing 30% of nitric acid, sulfuric acid being the remaining 70% of the nitrating acid. The mixture is then stirred for 2 hours at room temperature and finally poured on ice. Subsequently the whole is introduced into methylene chloride, shaken thoroughly with a sodium carbonate solution of 10% strength, dried and finally distilled off. There are obtained 268 parts of 2-chloro-5-nitrobenzotrichloride melting at 72° to 74° C. and corresponding to a yield of 97.4% of the theory. The melting point of the pure compound is between 75° and 76° C.

Example 2

586 parts of anhydrous nitrating acid containing 30% of nitric acid are added dropwise within 1 hour at 5° to 10° C. to 593 parts of o-fluorobenzotrichloride. The mixture is stirred for 2 hours at room temperature and worked up as described in Example 1. There are obtained 694 parts of 2-fluoro-5-nitrobenzotrichloride corresponding to a yield of 97% of the theory. The melting point is between 41° and 42° C.

Example 3

690 parts of p-chlorobenzotrichloride are added within 1 hour at 5° to 10° C. to 670 parts of anhydrous nitrating acid containing 30% of nitric acid while stirring. The mixture is then stirred for 2 hours at room temperature and poured on ice. Subsequently the whole is introduced into methylene chloride, the solution is washed with an aqueous sodium carbonate solution of 10% strength, and the methylene chloride is distilled off. There are obtained 665 parts of 4-chloro-5-nitrobenzotrichloride corresponding to a yield of 80.7% of the theory. The boiling point is between 132° and 134° C. under a pressure of 1.1 to 1.3 millimeters of mercury.

Example 4

450 parts of p-fluorobenzotrichloride are added dropwise within 1 hour at −5° to −4° C. to 850 parts of anhydrous nitrating acid containing 30% of nitric acid. The mixture is then after-stirred for 3 hours at −6° to −5° C. and worked up as described in Example 1. There are obtained 482 parts of 4-fluoro-5-nitrobenzotrichloride corresponding to a yield of 88.4% of the theory. The boiling point is between 121° to 125° C. under a pressure of 0.6 to 1.2 millimeters of mercury.

Example 5

185 parts of anhydrous nitrating acid containing 30% of nitric acid are added dropwise within 30 minutes at 5- to 10° C. to 200 parts of m-chlorobenzotrichloride. Subsequently the mixture is after-stirred for 90 minutes and worked up as described in Example 1. There are obtained 211 parts of mononitro-m-chlorobenzotrichloride corresponding to a yield of 87.9% of the theory. The boiling point is between 126° and 128° C. under a pressure of 0.5 to 0.6 millimeter of mercury.

Example 6

785 parts of zenzotrichloride are added dropwise within 75 minutes at 5° to 6° C. to 900 parts of anhydrous nitrating acid containing 30% of nitric acid. Subsequently the mixture is after-stirred for 2 hours at 6° to 7° C. and worked up as described in Example 1. There are obtained 871 parts of nitrobenzotrichloride corresponding to a yield of 90.5% of the theory. The boiling point is at 128° C. under a pressure of 1 millimeter of mercury.

Example 7

132 parts of 2,4-dichlorobenzotrichloride are introduced at 28° C. to 30° C. into 230 parts of anhydrous nitrating acid containing 30% of nitric acid, while stirring. The mixture is then after-stirred for 2 hours, whereby it is cooled to a temperature not exceeding 42° C. After having worked up the whole as described in Example 1, there are obtained 148 parts of 2,4-dichloro-5-nitrobenzotrichloride melting between 50° and 52° C. and corresponding to a yield of 95.7% of the theory. After recrystallization from petroleum ether, the melting point is between 56° and 57° C.

Example 8

56 parts of o-chlorobenzotrichloride are added dropwise within 25 minutes at 8° C. to 55 parts of anhydrous nitrating acid containing 30% of nitric acid and 20 parts of oleum of 30% strength. Subsequently the mixture is after-stirred for 30 minutes at 25° C., poured on ice, introduced into methylene chloride, and the solution is washed with an aqueous sodium carbonate solution of 10% strength. After having distilled off the methylene chloride, there are obtained 62 parts of 2-chloro-5-nitrobenzotrichloride corresponding to a yield of 93% of the theory. The melting point is between 70° and 71° C.

Example 9

23 parts of o-chlorobenzotrichloride are added dropwise within 15 minutes at 0° to 6° C. to 135 parts of anhydrous nitrating acid containing 87% of nitric acid, sulfuric acid being the remaining 13% of the nitrating acid. The mixture is then after-stirred for 15 minutes at 0° to 5° C. and worked up as described in Example 1. There are obtained 17 parts of 2-chloro-5-nitrobenzotrichloride melting at 70° to 72° C. and corresponding to a yield of 62% of the theory.

Even when using so high an excess of nitric acid, only a mononitration of the benzene nucleus occurs.

Example 10

115 parts of o-chlorobenzotrichloride are added dropwise within 40 minutes at 6° to 10° C. to 110 parts of a nitrating acid containing 30% of nitric acid which had been mixed with 7 parts of water. Subsequently the mixture is after-stirred for 2 hours at room temperature and worked up as described in Example 1. There are obtained 111 parts of 2-chloro-5-nitrobenzotrichloride melting at 68° to 72° C. and corresponding to a yield of 80% of the theory.

Example 11

50 parts of benzotrichloride were added within 40 minutes at about −10° C. to 320 parts of nitric acid of 98% strength. The mixture is after-stirred for 1 hour at −10° C. and subsequently poured on ice. After having introduced the whole into methylene chloride, shaken it thoroughly with a soda solution of 10% strength and dried it over calcium chloride, the substance is distilled off. There are obtained 33 parts of mononitrobenzotrichloride corresponding to a yield of 53.7% of the theory.

Example 12

98 parts of benzotrichloride are added within 45 minutes at 5° to 6° C. to 140 parts of nitrosulfuric acid containing 50% of nitric acid. The mixture is then after-stirred for 2 hours at 2° to 4° C. After having worked up the whole as described in Example 12, there are obtained 108 parts of mononitrobenzotrichloride corresponding to a yield of 90% of the theory.

Example 13

23 parts of o-chlorobenzotrichloride are added within 40 minutes at 5° to 10° C. to 50 parts of nitric acid of 98% strength. The mixture is then after-stirred for 15 minutes at 8° C. and worked up as described in Example 12. There are obtained 22 parts of 2-chloro-5-nitrobenzotrichloride corresponding to a yield of 80% of the theory.

Example 14

77 parts of o-chlorobenzotrichloride dissolved in 100 parts of carbon tetrachloride are added dropwise within 1 hour to 77 parts of anhydrous nitrosulfuric acid containing 30% of nitric acid. The mixture is then after-stirred at room temperature, whereby the temperature is raised to 40° C. After having after-stirred for 4 hours, the substance is separated from the acid mixture, the organic layer is shaken thoroughly with a soda solution of 10% strength, dried over calcium chloride and the solvent evaporated in vacuo. There are thus obtained 91 parts of 2-chloro-5-nitrobenzotrichloride melting at 72° and 74° C. and corresponding to a yield of 98.7% of the theory.

Example 15

232 parts of 2,4-difluorobenzotrichloride are added at 5° to 15° C. to 230 parts of anhydrous nitrating acid (a mixture of nitric and sulfuric acid) containing 30% of nitric acid. Subsequently the mixture is stirred for 2 hours at room temperature and worked up as described in Example 1. There are obtained 260 parts of 2,4-difluoro-5-nitrobenzotrichloride melting at 39° C. and corresponding to a yield of 94% of the theory.

Example 16

124 parts of 2-fluoro-4-chlorobenzotrichloride are added at 15° to 30° C. to 230 parts of anhydrous nitrating acid (a mixture of nitric and sulfuric acid) containing 30% of nitric acid. After having worked up the mixture as described in Example 1, there are obtained 140 parts of 2-fluoro-4-chloro-5-nitrobenzotrichloride melting at 45° C. and corresponding to a yield of 95% of the theory.

We claim:

1. Nitrobenzotrichlorides having the formula

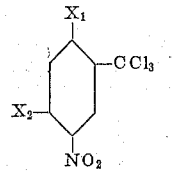

wherein $X_1$, $X_2$ represent members of the group consisting of hydrogen, chlorine and fluorine, not more than one of them being hydrogen.

2. The nitrobenzotrichloride having the formula

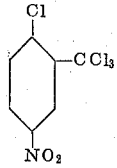

3. The nitrobenzotrichloride having the formula

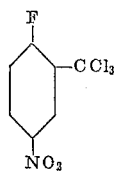

4. The nitrobenzotrichloride having the formula

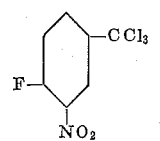

5. The nitrobenzotrichloride having the formula

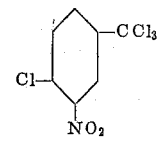

6. The nitrobenzotrichloride having the formula

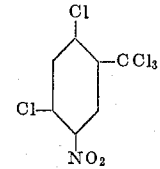

7. A process for preparing nitrobenzotrichlorides having the formula

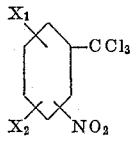

wherein $X_1$, $X_2$ represent members of the group consisting of hydrogen, chlorine and fluorine, which comprises reacting a benzotrichloride having the formula

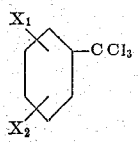

wherein $X_1$, $X_2$ represent members of the group consisting of hydrogen, chlorine and fluorine, at a temperature in the range of from about $-20°$ C. to about $+40°$ C. with a nitrating agent selected from the group consisting of (1) nitric acid having a strength from 95 to 98 percent and (2) a mixture of nitric and sulfuric acid, said mixture containing sulfur trioxide in the range of from 0 to 30 percent by weight calculated on the amount of sulfuric acid being present in said mixture and at most 30 percent by weight of water calculated on the amount of sulfuric acid being present in said mixture during the nitration process.

8. A process as claimed in claim 7, wherein the nitration is carried out in carbon tetrachloride as an inert organic solvent.

9. A process for preparing nitrobenzotrichlorides having the formula

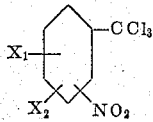

wherein $X_1$ and $X_2$ represent members of the group consisting of hydrogen, chlorine and fluorine which comprises reacting a benzotrichloride having the formula

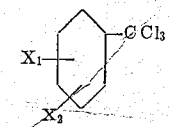

wherein $X_1$ and $X_2$ represent members of the group consisting of hydrogen, chlorine and fluorine at a temperature in the range of from about $-20°$ C. to about $+40°$ C. with a nitrating agent selected from the group consisting of (1) nitric acid having a strength of from 95% to 98% and (2) a mixture of from 5% to 85% nitric acid and from 95% to 15% sulfuric acid and containing up to 30% of sulfur trioxide and up to 30% of water, each calculated on the amount of sulfuric acid.

References Cited by the Examiner

Smith et al.: Journal of Organic Chemistry, vol. 26, pp. 4713–4715 (November 1961), QD 241 J6.

P. P. Shorygin et al.: CA, vol. 53, 1916(e), 1959, QD1A51.

"Uses and Applications of Chemicals and elated Materials" (Gregory), ( published by Rinhold Publishing Corp., New York, 1939, TP 9 G79.

CARL D. QUARFORTH, *Primary Examiner.*